(12) United States Patent
Zhang et al.

(10) Patent No.: US 11,042,777 B2
(45) Date of Patent: Jun. 22, 2021

(54) CLASSIFICATION METHOD AND CLASSIFICATION DEVICE OF INDOOR SCENE

(71) Applicant: SHENZHEN INSTITUTES OF ADVANCED TECHNOLOGY, Shenzhen (CN)

(72) Inventors: Junyu Zhang, Shenzhen (CN); Hui Huang, Shenzhen (CN)

(73) Assignee: SHENZHEN INSTITUTES OF ADVANCED TECHNOLOGY, Shenzhen (CN)

( * ) Notice: Subject to any disclaimer, the term of this patent is extended or adjusted under 35 U.S.C. 154(b) by 64 days.

(21) Appl. No.: 16/495,401

(22) PCT Filed: Mar. 27, 2017

(86) PCT No.: PCT/CN2017/078291
§ 371 (c)(1),
(2) Date: Sep. 19, 2019

(87) PCT Pub. No.: WO2018/176195
PCT Pub. Date: Oct. 4, 2018

(65) Prior Publication Data
US 2020/0019816 A1 Jan. 16, 2020

(51) Int. Cl.
*G06K 9/62* (2006.01)
*G06K 9/00* (2006.01)
(52) U.S. Cl.
CPC ....... *G06K 9/6231* (2013.01); *G06K 9/00664* (2013.01); *G06K 9/6267* (2013.01)
(58) Field of Classification Search
CPC ............. G06K 9/6231; G06K 9/00664; G06K 9/6267; G06K 9/00771
See application file for complete search history.

(56) References Cited

U.S. PATENT DOCUMENTS

| 8,718,393 | B2 * | 5/2014 | Chen | ............... G06T 15/205 382/254 |
| 2015/0012209 | A1 * | 1/2015 | Park | ............... G05D 1/0231 701/408 |

(Continued)

FOREIGN PATENT DOCUMENTS

| CN | 101389004 A | 3/2009 |
| CN | 102722520 A | 10/2012 |

(Continued)

OTHER PUBLICATIONS

International Search Report issued in corresponding International application No. PCT/CN2017/078291, dated Dec. 26. 2017.

(Continued)

*Primary Examiner* — Siamak Harandi (57) ABSTRACT

The present disclosure provides a classification method and a classification device of an indoor scene. The classification method includes steps: receiving an input scene picture to be classified; obtaining a current local observation area from the scene picture to be classified according to a observation area positioning model; processing image information of the current local observation area to obtain a feature vector; obtaining a classification prediction result according to the feature vector; determining Whether the classification prediction result satisfies a predetermined scene picture classification condition; if not, obtaining a next local observation area from the scene picture to be classified and setting the next local observation area to be the current local observation area, then skipping to the step of processing the image information of the current local observation area; if yes, obtaining a classification label of the scene picture to be classified.

10 Claims, 4 Drawing Sheets

(56) References Cited

U.S. PATENT DOCUMENTS

2016/0086015 A1    3/2016   Irmatov et al.
2019/0213212 A1*   7/2019   Adato .................. G06F 16/235

FOREIGN PATENT DOCUMENTS

CN    104268546 A    1/2015
CN    105809146 A    7/2016

OTHER PUBLICATIONS

Written Opinion of the International Searching Authority for No. PCTICN2017/078291.

* cited by examiner

CLASSIFICATION METHOD AND CLASSIFICATION DEVICE OF INDOOR SCENE

TECHNICAL FIELD

The present disclosure relates to a field of computer technology, and in particular to a classification method and a classification device of an indoor scene.

BACKGROUND

Intelligent identification and classification are key issues in computer vision. In numerous studies, major points of issues focus on object recognition (a picture includes one or more objects) and facial recognition (an image with a face). Compared with these studies, indoor scene recognition is extremely challenging and is one of the most difficult classification tasks. The difficulty of indoor scene recognition lies in the fact that indoor scenes not only include a large number of different objects, but also placement of these objects in space are various. In order to accurately classify indoor scenes, not only information of objects in the scenes are analyzed, but also characteristics of an entire scene structure are extracted.

In order to improve ability to identify scenes, many scholars have conducted in-depth research and proposed many effective methods. Current classification methods of scene recognition mainly include a spatial pyramid method, a method based on high-level semantic information, and a method based on a convolutional neural network.

These methods have obvious defects. The feature representation of the spatial pyramid method only relies on low-level geometric information and lacks extraction of high-level semantic information, which limits the ability to identify scenes. The scene recognition method based on high-level semantic information is limited by a range of selected objects, which greatly affects the ability of model classification. A main disadvantage of the method based on convolutional neural network is that a training process consumes a lot of resources, and is mainly effective in detection and classification of objects. For example, the method based on the convolutional neural network is able to achieve a 94% recognition rate when performed object recognition on computer vision system (ImageNet) identification data set, while method based on the convolutional neural network achieves only 69% recognition rate when performed on publicly available MIT-67 data set, the reason is that the recognition of the indoor scenes depends not only on the objects in the scene, but also on an overall relationship between the objects. However, features directly extracted by the convolutional neural network method cannot grasp the fusion of overall information and local information.

SUMMARY

The present disclosure provides a classification method and a classification device of an indoor scene to solve a problem that conventional scene recognition classification methods are not accurate and the classification rate is not good.

The present disclosure provides a classification method of an indoor scene. The method includes following steps:

receiving an input scene picture to be classified;

obtaining a current local observation area from the scene picture to be classified according to a predetermined observation area positioning model;

processing the image information of the current local observation area to obtain a feature vector of the scene picture to be classified;

obtaining a classification prediction result of the scene picture to be classified according to the feature vector, determining whether the classification prediction result satisfies a predetermined scene picture classification condition;

obtaining a next local observation area from the scene picture to be classified according to the predetermined observation area positioning model, and setting the next local observation area to be the current local observation area, and then skipping to the step of processing the image information of the current local observation area to obtain the feature vector of the scene picture to be classified, when the classification prediction result does not satisfy the scene picture classification condition: and obtaining a classification label of the scene picture to be classified according to the classification prediction result, when the classification prediction result satisfies the scene picture classification condition.

The present disclosure further provides a classification device of an indoor scene. The device includes:

a picture receiving unit receiving an input scene picture to be classified;

an area obtaining unit obtaining a current local observation area from the scene picture to be classified according to a predetermined observation area positioning model;

a vector obtaining unit processing the image information of the current local observation area to obtain a feature vector of the scene picture to be classified;

a condition determining unit obtaining a classification prediction result of the scene picture to be classified according to the feature vector, and determining whether the classification prediction result satisfies a predetermined scene picture classification condition;

a repeat execution unit obtaining a next local observation area from the scene picture to be classified according to the predetermined observation area positioning model and setting the next local observation area to be the current local observation area and then triggering the vector obtaining unit to process the image information of the current local observation area, when the classification prediction result does not satisfy the scene picture classification condition; and a scene classification unit obtaining a classification label of the scene picture to be classified according to the classification prediction result, when the classification prediction result satisfies the scene picture classification condition.

In the present disclosure, after receiving the input scene picture to be classified, the current local observation area is obtained from the scene picture to be classified according to the predetermined observation area positioning model. And the image information of the current local observation area is processed to obtain the feature vector of the scene picture to be classified. And the classification prediction result of the scene picture to be classified is obtained according to the feature vector, and then to determine whether the classification prediction result satisfies the predetermined scene picture classification condition. When the classification prediction result does not satisfy the scene picture classification condition the next local observation area is obtained from the scene picture to be classified according to the predetermined observation area positioning model, and the next local observation area is set to be the current local observation area, and then is skipped to the step of processing the image information of the current local observation area to obtain the feature vector of the scene picture to be classified until the classification prediction result satisfies the scene picture classification condition. When the classification prediction result satisfies the scene picture classification condition, the classification label of the scene picture to be classified is obtained according to the classification prediction result. Thus, classification rate and accuracy of scene recognition classification is improved.

DETAILED DESCRIPTION

The present disclosure will be further described in detail below with reference to the accompanying drawings and embodiments. It should be understood that the specific embodiments described herein are merely illustrative of the present disclosure and are not intended to limit the present disclosure.

The specific implementation of the present disclosure is described in detail below in conjunction with specific embodiments.

Embodiment 1

Figure 1:
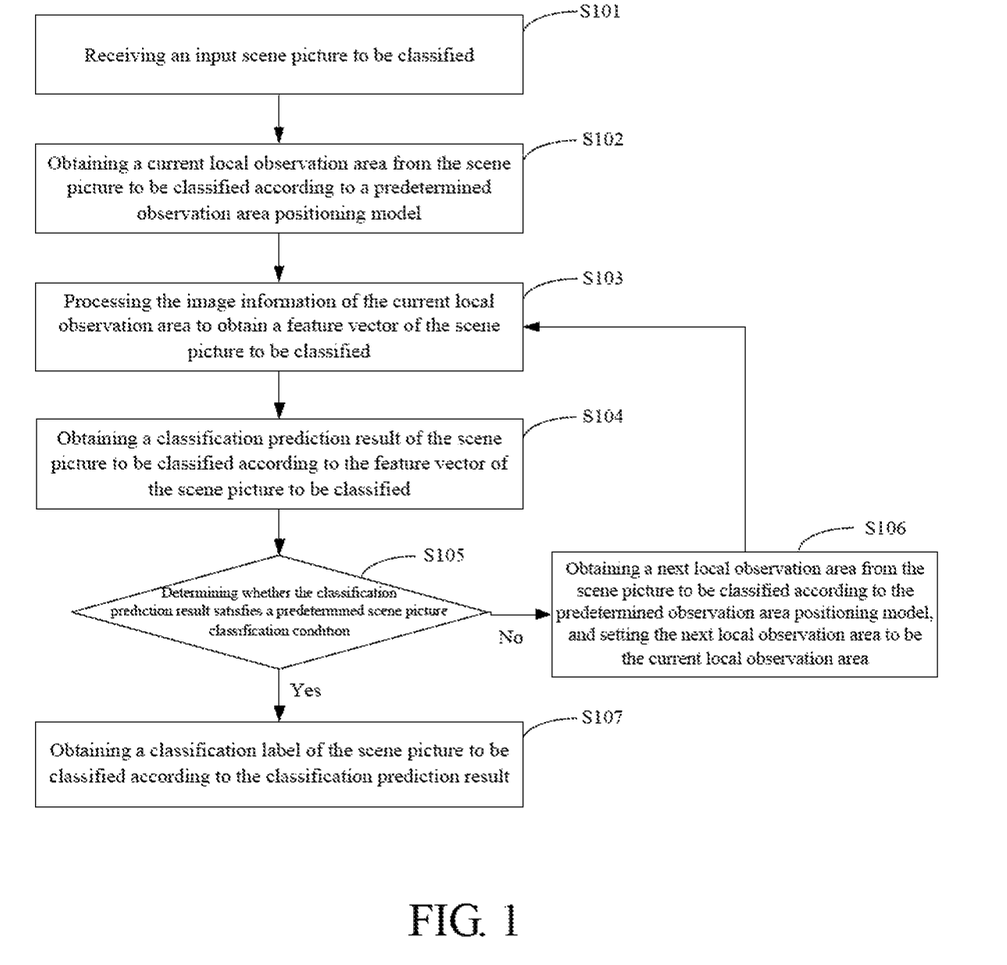
FIG. 1 is a flowchart of a classification method of an indoor scene provided by embodiment 1 of the present disclosure.

FIG. 1 is a flowchart of a classification method of an indoor scene provided by embodiment 1 of the present disclosure. For the convenience of description, only parts that relate to the embodiment 1 of the present disclosure are shown, which are detailed as follows:

In S101: receiving an input scene picture to be classified.

In S102: obtaining a current local observation area from the scene picture to be classified according to a predetermined observation area positioning model.

In the embodiment, the scene picture to be classified is a picture corresponding to an indoor scene to be classified. In order to reduce complexity of calculation in a classification process and improve controllability of identification and classification, only one local observation area is selected from the scene picture at a time for identification and classification according to the observation area positioning model.

In S103: processing the image information of the current local observation area to obtain a feature vector of the scene picture to be classified.

In the embodiment, optionally, after obtaining the image information of the current local observation area, when processing the image information of the current local observation area, the image information of the current local observation area is encoded to obtain a local feature vector. And a fusion operation is performed on the local feature vector and a pre-stored feature vector to obtain the feature vector of the scene picture to be classified. Therefore, comprehensiveness of the feature vector is improved, which further improves accuracy of the classification of the scene picture.

In S104: obtaining a classification prediction result of the scene picture to be classified according to the feature vector of the scene picture to be classified.

In S105: determining whether the classification prediction result satisfies a predetermined scene picture classification condition.

In the embodiment, the classification prediction result includes a classification result and a corresponding prediction probability. After obtaining the feature vector of the image information of the scene picture to be classified, a plurality of classification results of the scene picture and corresponding prediction probabilities are obtained according to the feature vector. A summation of the prediction probabilities of the plurality of classification results is 100%, to determine whether a classification result in its corresponding prediction probability being greater than a predetermined threshold in the plurality of classification results, that is, to determine whether the classification prediction result satisfies a predetermined condition for classifying the scene picture to be classified. As an example, the predetermined threshold of the prediction probabilities is able to be set to 65% to determine whether there is the classification result in its corresponding prediction probability being greater than 65% in the plurality of classification results.

In S106: obtaining a next local observation area from the scene picture to be classified according to the predetermined observation area positioning model, and setting the next local observation area to be the current local observation area, and then skipping to the step of processing the image information of the current local observation area to obtain a feature vector of the scene picture to be classified, when the classification prediction result does not satisfy the scene picture classification condition.

In the embodiment, when there is no classification result in its corresponding prediction probability being greater than the predetermined threshold in the plurality of classification results, this means that the present classification prediction result does not satisfy the predetermined condition for classifying the scene picture to be classified. In order to achieve the classification of the scene picture to be classified, more area information of the scene picture should be obtained. Thus, the next local observation area is obtained from the scene picture to be classified according to the predetermined observation area positioning model, and the next local observation area is set to be the current local observation area. The processing of the image information is repeated to obtain the classification prediction result until the classification prediction result satisfies the predetermined scene picture classification condition.

In S107: obtaining a classification label of the scene picture to be classified according to the classification prediction result, when the classification prediction result satisfies the scene picture classification condition.

In the embodiment, when there is the classification result that its corresponding prediction probability is greater than the predetermined threshold in the plurality of classification results, this means that the classification prediction result satisfies the predetermined condition for classifying the scene picture to be classified, that is, the classification of the scene picture to be classified is realized. Thus, the classification result in its corresponding prediction probability being greater than the predetermined threshold in the plurality of classification results is obtained, and the classification result is set to be the classification label of the scene picture to be classified, thereby improving the accuracy of the classification of the scene picture.

In the embodiment, after receiving the input scene picture to be classified, the current local observation area is obtained from the scene picture to be classified according to the predetermined observation area positioning model, thereby reducing complexity of the calculation in the identification and classification process and improving controllability of the identification and classification. And the image information of the current local observation area is processed to obtain the feature vector of the scene picture to be classified, which improves the classification rate of the scene picture. And the classification prediction result of the scene picture to be classified is obtained according to the feature vector, and then to determine whether the classification prediction result satisfies the predetermined scene picture classification condition. When the classification prediction result does not satisfy the scene picture classification condition, the next local observation area is obtained from the scene picture to be classified according to the predetermined observation area positioning model, and the next local observation area is set to be the current local observation area, and then repeat the processing of the image information of the current local observation area to obtain the classification prediction result, until the classification prediction result satisfies the scene picture classification condition. When the classification prediction result satisfies the scene picture classification condition, the classification label of the scene picture to be classified is obtained according to the classification prediction result. Thus, classification accuracy of scene picture classification is improved.

Embodiment 2

Figure 2:
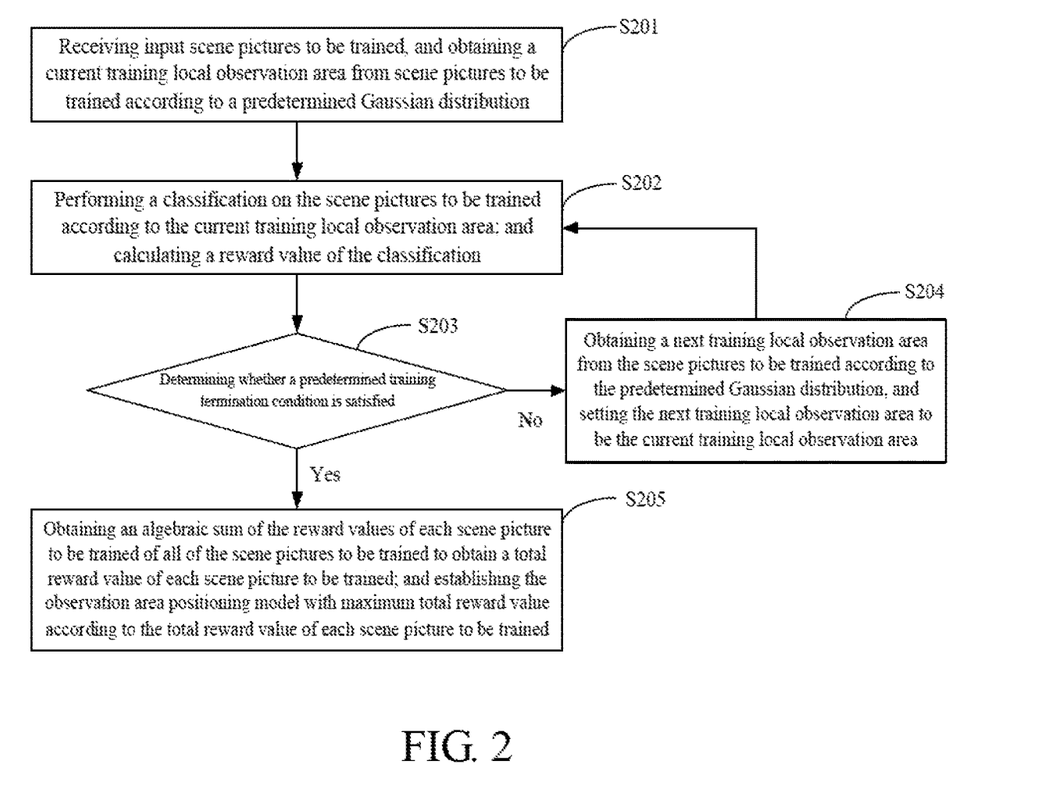
FIG. 2 is a flowchart showing an implementation of establishing an observation area positioning model in a classification method of an indoor scene according to embodiment 2 of the present disclosure.

FIG. 2 is a flowchart showing an implementation of establishing an observation area positioning model in a classification method of an indoor scene according to embodiment 2 of the present disclosure. For the convenience of description, only parts that relate to the embodiment 2 of the present disclosure are shown, which are detailed as follows.

In S201: receiving input scene pictures to be trained, and obtaining a current training local observation area from scene pictures to be trained according to a predetermined Gaussian distribution.

In the embodiment, the scene pictures to be trained are input scene pictures need to be classified during the local observation area positioning training process of the indoor scene. In order to reduce complexity of the calculation in the identification and classification process and improve controllability of the identification and classification, only one local observation area is selected from the scene picture at a time for identification and classification according to the observation area positioning model. Optionally, a size of the local observation area is able to be adjusted according to actual conditions during the training process to optimize training result.

In S202: performing a classification on the scene pictures to be trained according to the current training local observation area; and calculating a reward value of the classification.

In the embodiment, after obtaining a feature vector of the scene pictures to be trained according to a processing of image information of the current training local observation area, the scene pictures to be trained are classified to obtain a classification label of the scene pictures to be trained according to the feature vector of the scene pictures to be trained. Optionally, after obtaining the image information of the training local observation area, when processing the image information of the current training local observation area, first, the image information of the current training local observation area is encoded to obtain a local feature vector, and then a fusion operation is performed on the obtained local feature vector and a pre-stored feature vector to obtain the feature vector of the image information of the scene picture to be classified, thereby improving comprehensiveness of the feature vector and improving the accuracy of the scene image classification. Optionally, dimensions of the feature vector are able to be adjusted during training to optimize the training result.

In the embodiment, after obtaining the classification label of the scene image to be trained, a standard classification label of the scene pictures to be trained is obtained. And the classification label of the scene pictures to be trained is determined that whether the classification label is correct or not, and the reward value of the classification is calculated. Optionally, when calculating the reward value of the classification, the reward value of the classification is calculated by a predetermined calculation formula $$r_t = \begin{cases} 1 \text{ when } t = 1, & y = \max_y \log p(y) \\ 1 \text{ when } t > 1, & y = \max_y \log p(y) \text{ and } loss_t < loss_{t-1} \\ 0 \text{ other situation} \end{cases}$$

where $r_t$ is a reward value of tth classification, t is the number of the classification; the y is the classification label obtained by training; the $loss_t$ is a classification error of the t th classification, and the $y=\max_y \log p(y)$ represents that the classification label obtained is correct. Thus, it avoids repeatedly observing the same area and avoids observing areas with too much noise. Optionally, a feedback value in the calculation formula of the reward value is able to be appropriately changed during the training process to optimize a speed of the model convergence, thereby optimizing the training model.

In S203: determining whether a predetermined training termination condition is satisfied.

In S204: obtaining a next training local observation area from the scene pictures to be trained according to the predetermined Gaussian distribution, and setting the next training local observation area to be the current training local observation area and then skipping to the step of performing the classification on the scene pictures to be trained according to the current training local observation area, and calculating the reward value of the classification, when the predetermined training termination condition is not satisfied.

In the embodiment of the present disclosure, during the training, the next training local observation area is sampled from a Gaussian distribution of a given variance. The next training local observation area obtained by sampling is repeatedly identified. And scene pictures to be trained are classified according to the identified information to obtain the classification label, and each classification is calculated to obtain a corresponding reward value.

In S205: obtaining an algebraic sum of the reward values of each scene picture to be trained of all of the scene pictures to be trained to obtain a total reward value of each scene picture to be trained, and establishing the observation area positioning model with maximum total reward value according to the total reward value of each scene picture to be trained, when the predetermined training termination condition is satisfied;

In the embodiment, if the predetermined training termination condition is satisfied, the algebraic sum of the reward values of each scene picture to be trained of all of the scene pictures to be trained is obtained to obtain the total reward value of each scene picture to be trained. Each scene picture to be trained of all of the scene pictures to be trained has a corresponding total reward value. The observation area positioning model with maximum total reward value is established according to the total reward value of each scene picture to be trained, which is configured to determine a optimal next local observation area in the process of classifying the scene picture to be classified, thereby improving the classification rate and accuracy of the scene identification and classification.

One of ordinary skill in the art can understand that all or part of the steps of implementing the above embodiments are completed by a program instructing related hardware, and the program may be stored in a readable storage medium of a computer. The readable storage medium is selected from ROM/RAM, disk, CD, etc.

Embodiment 3

Figure 3:
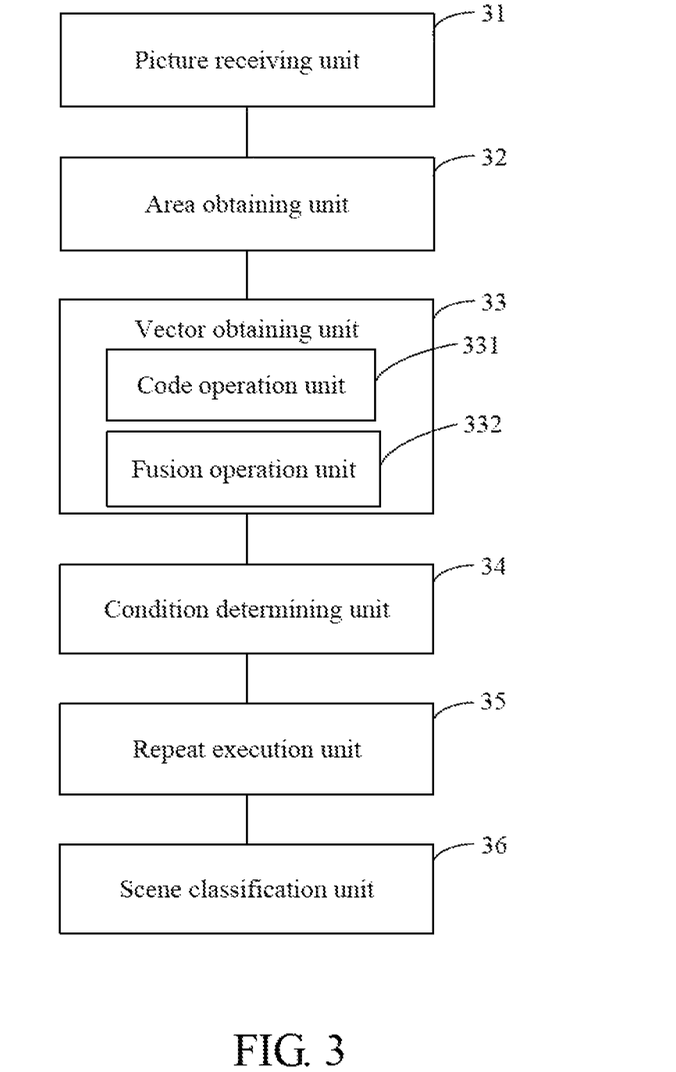
FIG. 3 is a schematic diagram of a classification device of an indoor scene provided by embodiment 3 of the present disclosure.

FIG. 3 is a schematic diagram showing a structure of a classification device of an indoor scene according to embodiment 3 of the present disclosure. For the convenience of description, only parts that relate to the embodiment 3 of the present disclosure are shown.

In the embodiment, the classification device of an indoor scene comprises a picture receiving unit 31, an area obtaining unit 32, a vector obtaining unit 33, a condition determining unit 34, a repeat execution unit 35, and a scene classification unit 36.

The picture receiving unit 31 is configured to receive an input scene picture to be classified.

The area obtaining unit 32 is configured to obtain a current local observation area from the scene picture to be classified according to a predetermined observation area positioning model.

The vector obtaining unit 33 is configured to process the image information of the current local observation area to obtain a feature vector of the scene picture to be classified.

In the embodiment, optionally, after obtaining the image information of the current local observation area, when processing the image information of the current local observation area, first, the image information of the current local observation area is encoded to obtain a local feature vector. And then a fusion operation is performed on the obtained local feature vector and a pre-acquired feature vector to obtain the feature vector of the image information of the scene picture to be classified. Therefore, comprehensiveness of the feature vector is improved, which further improves accuracy of the classification of the scene picture.

Optionally, the vector obtaining unit 33 comprises:

a code operation unit 331 configured to encode the image information of the current local observation area to obtain a local feature vector;

a fusion operation unit 332 configured to perform a fusion operation on the local feature vector and a pre-stored feature vector to obtain the feature vector of the scene picture.

The condition determining unit 34 is configured to obtain a classification prediction result of the scene picture to be classified according to the feature vector, and determine whether the classification prediction result satisfies a predetermined scene picture classification condition.

The repeat execution unit 35 is configured to obtain a next local observation area from the scene picture to be classified according to the predetermined observation area positioning model and set the next local observation area to be the current local observation area and then trigger the vector obtaining unit 33 to process the image information of the current local observation area, when the classification prediction result does not satisfy the scene picture classification condition.

The scene classification unit 36 is configured to obtain a classification label of the scene picture to be classified according to the classification prediction result, when the classification prediction result satisfies the scene picture classification condition.

In the embodiment, when there is the classification result that its corresponding prediction probability is greater than the predetermined threshold in the plurality of classification results, it means that the classification prediction result satisfies the predetermined condition for classifying the scene picture to be classified, that is, the classification of the scene picture to be classified is realized. Thus, the scene classification unit obtains the classification result in its corresponding prediction probability being greater than the predetermined threshold in the plurality of classification results, and set the classification result to be the classification label of the scene picture to be classified, thereby improving the accuracy of the classification of the scene picture.

In the embodiment of the present disclosure, each unit of the classification device of the indoor scene is able to be implemented by a corresponding hardware or software unit, and each unit may be an independent software and hardware unit, or may be integrated into one software and hardware unit, and is not limited thereto. For a specific implementation of each unit, reference may be made to the description of the foregoing embodiment 1, and details are not described herein again.

Embodiment 4

Figure 4:
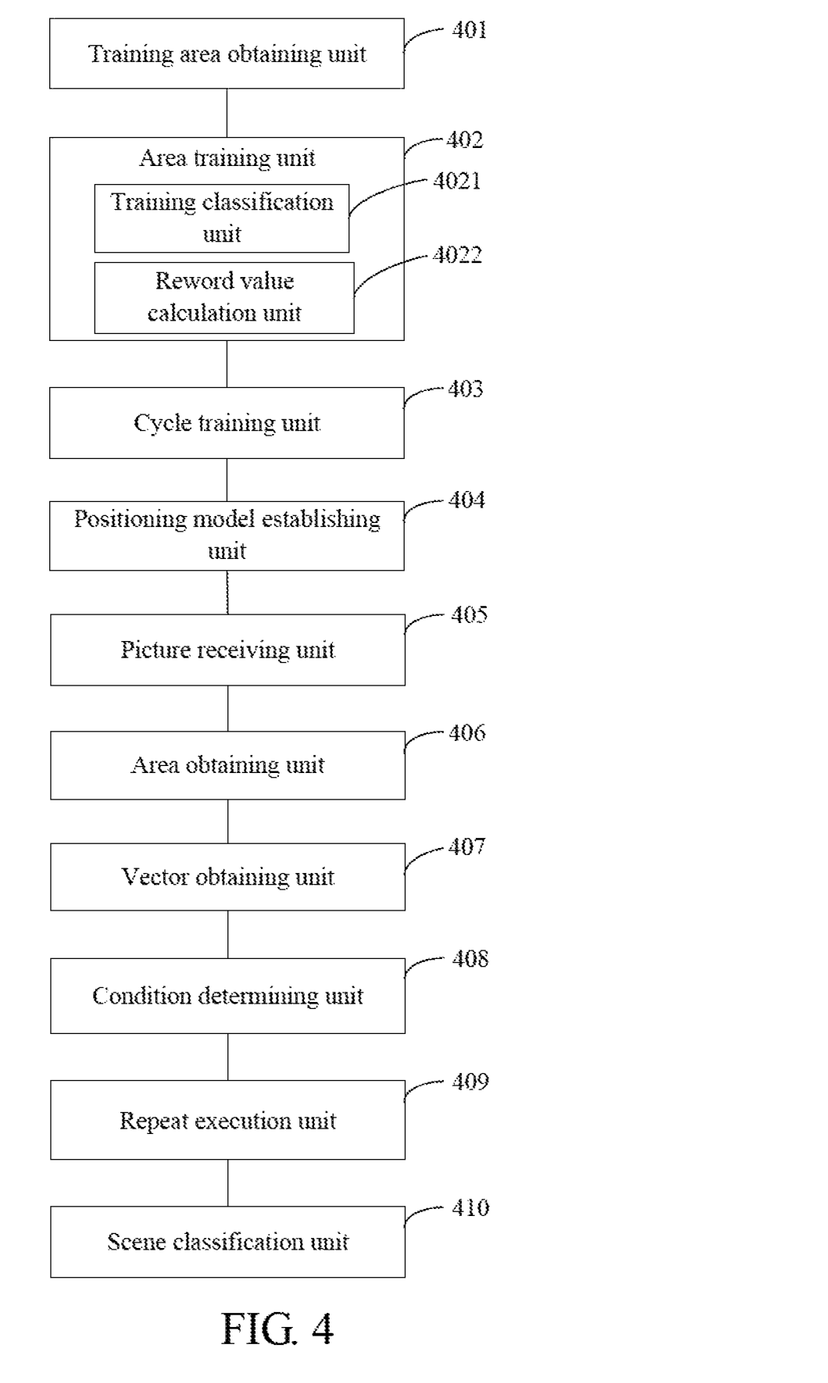
FIG. 4 is a schematic diagram of a classification device of an indoor scene provided by embodiment 4 of the present disclosure.

FIG. 4 is a schematic diagram showing a structure of a classification device of an indoor scene according to embodiment 4 of the present disclosure. For the convenience of description, only parts that relate to the embodiment 4 of the present disclosure are shown.

In the embodiment of the present disclosure, The classification device of the indoor scene comprises a training area obtaining unit 401, an area training unit 402, a cycle training unit 403, a positioning model establishing unit 404, a picture receiving unit 405, an area obtaining unit 406, a vector Obtaining unit 407, a condition determining unit 408, a repeat execution unit 409, and a scene classification unit 410

The training area obtaining unit 401 is configured to receive input scene pictures to be trained, and configured to obtain a current training local observation area from scene pictures to be trained according to a predetermined Gaussian distribution.

The area training unit 402 is configured to performing a classification on the scene pictures to be trained according to the current training local observation area, and configured to calculate a reward value of the classification.

In the embodiment of present disclosure, after obtaining the classification label of the scene image to be trained, a standard classification label of the scene pictures to be trained is obtained. And the obtained standard classification label is determined that whether the classification label is correct or not. A reward value calculation unit calculates the reward value of the classification according to a determination result. Optionally, when calculating the reward value of the classification, the reward value of the classification is calculated by a predetermined calculation formula:

$$r_t = \begin{cases} 1 & \text{when } t = 1, \quad y = \max_y \log p(y) \\ 1 & \text{when } t > 1, \quad y = \max_y \log p(y) \text{ and } loss_t < loss_{t-1} \\ 0 & \text{other situation} \end{cases}$$

where is a reward value of th classification, is the number of the classification; the is the classification label obtained by training; the is a classification error of the th classification, and the represents that the classification label obtained is correct. Thus, it avoids repeatedly observing the same area and avoids observing areas with too much noise. Optionally, a feedback value in the calculation formula of the reward value is able to be appropriately changed during the training process to optimize a speed of the model convergence, thereby optimizing the training model.

Optionally, the area training unit 402 comprises: a training classification unit 4021 configured to process image information of the current training local observation area to obtain a current feature vector of the scene pictures to be trained, and configured to classify the scene pictures to be trained to obtain a classification label of the scene pictures to be trained according to the current feature vector of the scene pictures to be trained; and the reward value calculation unit 4022 configured to obtain the standard classification label of the scene pictures to be trained, compare the obtained classification label with the standard classification label, determine whether the obtained classification label is correct or not, and calculate the reward value of the classification according to the determination result.

Optionally, the reward value calculation unit 4022 comprises
a calculation subunit configured to calculate a classification error and obtain a number of classifications, and calculate the reward value of the classification by the calculation formula of the classification reward value:

$$r_t = \begin{cases} 1 & \text{when } t = 1, \quad y = \max_y \log p(y) \\ 1 & \text{when } t > 1, \quad y = \max_y \log p(y) \text{ and } loss_t < loss_{t-1} \\ 0 & \text{other situation} \end{cases}$$

where is a reward value of th classification, is the number of the classification; the is the classification label obtained by training; the is a classification error of the th classification, and the represents that the classification label obtained is correct.

The cycle training unit 403 is configure to obtain a next training local observation area from the scene pictures to be trained according to the predetermined Gaussian distribution, and set the next training local observation area to be the current training local observation area, and then trigger the area training unit 402 to perform a classification on the scene pictures to be trained and to calculate the reward value of the classification according to the current training local observation area.

The positioning model establishing unit 404 is configured to obtain an algebraic sum of the reward values of each scene picture to be trained of all of the scene pictures to be trained to obtain a total reward value of each scene picture to be trained, and establish the observation area positioning model with maximum total reward value according to the total reward value of each scene picture to be trained, when the predetermined training termination condition is satisfied.

The picture receiving unit 405 is configured to receive an input scene picture to be classified.

The area obtaining unit 406 is configured to obtain a current local observation area from the scene picture to be classified according to a predetermined observation area positioning model.

The vector obtaining unit 407 is configured to process the image information of the current local observation area to obtain a feature vector of the scene picture to be classified.

The condition determining unit 408 is configured to obtain a classification prediction result of the scene picture to be classified according to the feature vector of the scene picture to be classified, and determine whether the classification prediction result satisfies a predetermined scene picture classification condition.

In the embodiment of the present disclosure, after obtaining the feature vector of the image information of the scene picture to be classified, the plurality of classification results of the scene picture and corresponding prediction probabilities are obtained according to the feature vector of the scene picture. A summation of the prediction probabilities of the plurality of classification results is 100%. The condition determining unit is configured to determine whether there is a classification result in its corresponding prediction probability being greater than a predetermined threshold in the plurality of classification results, that is, to determine whether the classification prediction result satisfies a predetermined condition for classifying the scene picture to be classified.

The repeat execution unit 409 is configured to obtain a next local observation area from the scene picture to be classified according to the predetermined observation area positioning model and set the next local observation area to be the current local observation area and then trigger the vector obtaining unit 407 to process the image information of the current local observation area, when the classification prediction result does not satisfy the scene picture classification condition.

The scene classification unit 410 is configured to obtain a classification label of the scene picture to be classified according to the classification prediction result, when the classification prediction result satisfies the scene picture classification condition.

In the embodiment of the present disclosure, each unit of the classification device of the indoor scene is able to be implemented by a corresponding hardware or software unit, and each unit may be an independent software and hardware unit, or may be integrated into one software and hardware unit, and is not limited thereto. For a specific implementation of each unit, reference may be made to the description of the foregoing embodiment 1, and details are not described herein again.

The above are only the optional embodiments of the present disclosure, and is not intended to limit the present disclosure. Any modifications, equivalent substitutions, and improvements made within the spirit and principles of the present disclosure should be included in the scope of the present disclosure.

What is claimed is:
1. A classification method of an indoor scene, comprising following steps:
receiving an input scene picture to be classified;

obtaining a current local observation area from the scene picture to be classified according to a predetermined observation area positioning model;

processing image information of the current local observation area to obtain a feature vector of the scene picture to be classified;

obtaining a classification prediction result of the scene picture to be classified according to the feature vector of the scene picture to be classified; determining whether the classification prediction result satisfies a predetermined scene picture classification condition;

in response to the classification prediction result not satisfying the predetermined scene picture classification condition, obtaining a next local observation area from the scene picture to be classified according to the predetermined observation area positioning model, and setting the next local observation area to be the current local observation area, and then skipping to the step of processing the image information of the current local observation area to obtain the feature vector of the scene picture to be classified; and in response to the classification prediction result satisfying the predetermined scene picture classification condition, obtaining a classification label of the scene picture to be classified according to the classification prediction result.

2. The classification method according to claim 1, wherein before the step of receiving the input scene picture to be classified, the classification method further comprises steps:

receiving input scene pictures to be trained, obtaining a current training local observation area from scene pictures to be trained according to a predetermined Gaussian distribution;

performing a classification on the scene pictures to be trained according to the current training local observation area; and calculating a reward value of the classification;

obtaining a next training local observation area from the scene pictures to be trained according to the predetermined Gaussian distribution, and setting the next training local observation area to be the current training local observation area and then skipping to the step of performing the classification on the scene pictures to be trained according to the current training local observation area, and calculating the reward value of the classification, when a predetermined training termination condition is not satisfied; and obtaining an algebraic sum of the reward values of each scene picture to be trained of all of the scene pictures to be trained to obtain a total reward value of each scene picture to be trained, and establishing the observation area positioning model with maximum total reward value according to the total reward value of each scene picture to be trained, when the predetermined training termination condition is satisfied.

3. The classification method according to claim 2, wherein the step of performing the classification on the scene pictures to be trained according to the current training local observation area and calculating the reward value of the classification comprises steps:

processing image information of the current training local observation area to obtain a current feature vector of the scene pictures to be trained; classifying the scene pictures to be trained to obtain a classification label of the scene pictures to be trained according to the current feature vector of the scene pictures to be trained; and obtaining a standard classification label of the scene pictures to be trained; comparing the classification label of the scene pictures to be trained with the standard classification label of the scene pictures to be trained, determining whether the classification label of the scene pictures to be trained is correct or not, and calculating the reward value of the classification according to a determination result of the classification label of the scene pictures to be trained.

4. The classification method according to claim 3, wherein the step of calculating the reward value of the classification according to the determination result comprises steps:

calculating a classification error and obtaining a number of classifications, and calculating the reward value of the classification by a predetermined calculation formula of a classification reward value;

$$r_t = \begin{cases} 1 \text{ when } t = 1, & y = \max_y \log p(y) \\ 1 \text{ when } t > 1, & y = \max_y \log p(y) \text{ and } loss_t < loss_{t-1} \\ 0 \text{ other situation} \end{cases}$$

wherein $r_t$ is a reward value of tth classification, t is the number of the classification; the y is the classification label obtained by training; the $loss_t$ is a classification error of the tth classification, and the $y = \max_y \log p(y)$ represents that the classification label obtained is correct.

5. The classification method according to claim 1, wherein the step of processing the image information of the current local observation area to obtain the feature vector of the scene picture to be classified comprises steps:

encoding the image information of the current local observation area to obtain a local feature vector;

performing a fusion operation on the local feature vector and a pre-stored feature vector to obtain the feature vector of the scene picture to be classified.

6. A classification device of an indoor scene, comprising at least one processor and a non-transitory computer-readable storage medium coupled to the at least one processor, the non-transitory computer-readable storage medium storing program instructions that when executed by the at least one processor causes the classification device to perform the following operations:

receiving an input scene picture to be classified;

obtaining a current local observation area from the scene picture to be classified according to a predetermined observation area positioning model;

processing image information of the current local observation area to obtain a feature vector of the scene picture to be classified;

obtaining a classification prediction result of the scene picture to be classified according to the feature vector of the scene picture to be classified; determining whether the classification prediction result satisfies a predetermined scene picture classification condition;

in response to the classification prediction result not satisfying the predetermined scene picture classification condition, obtaining a next local observation area from the scene picture to be classified according to the predetermined observation area positioning model and setting the next local observation area to be the current local observation area and then triggering the vector obtaining unit to process the image information of the current local observation area; and in response to the classification prediction result satisfying the predetermined scene picture classification condition, obtaining a classification label of the scene picture to be classified according to the classification prediction result.

7. The classification device according to claim 6, wherein the program instructions when executed by the at least one processor further causes the classification device to perform the following operations prior to the operation of receiving the input scene picture to be classified:
receiving input scene pictures to be trained, and obtaining a current training local observation area from scene pictures to be trained according to a predetermined Gaussian distribution;
performing a classification on the scene pictures to be trained according to the current training local observation area, and calculating a reward value of the classification;
obtaining a next training local observation area from the scene pictures to be trained according to the predetermined Gaussian distribution, and setting the next training local observation area to be the current training local observation area, and then triggering the area training unit to perform a classification on the scene pictures to be trained and to calculate a reward value of the classification according to the current training local observation area, when a predetermined training termination condition is not satisfied; and
obtaining an algebraic sum of the reward values of each scene picture to be trained of all of the scene pictures to be trained to obtain a total reward value of each scene picture to be trained, and establishing the observation area positioning model with maximum total reward value according to the total reward value of each scene picture to be trained, when the predetermined training termination condition is satisfied.

8. The classification device according to claim 7, wherein the operation of performing the classification on the scene pictures to be trained according to the current training local observation area and calculating the reward value of the classification comprises:
processing image information of the current training local observation area to obtain a current feature vector of the scene pictures to be trained, and classifying the scene pictures to be trained to obtain a classification label of the scene pictures to be trained according to the current feature vector of the scene pictures to be trained; and
obtaining a standard classification label of the scene pictures to be trained, comparing the classification label of the scene pictures to be trained with the standard classification label of the scene pictures to be trained, determining whether the classification label of the scene pictures to be trained is correct or not, and calculating the reward value of the classification according to a determination result of the classification label of the scene pictures to be trained.

9. The classification device according to claim 8, wherein the operation of calculating the reward value of the classification according to the determination result comprises:
calculating a classification error and obtaining a number of classifications, calculating the reward value of the classification by a predetermined calculation formula of a classification reward value;

$$r_t = \begin{cases} 1 & \text{when } t = 1, \quad y = \max_y \log p(y) \\ 1 & \text{when } t > 1, \quad y = \max_y \log p(y) \text{ and } loss_t < loss_{t-1} \\ 0 & \text{other situation} \end{cases}$$

wherein $r_t$ is a reward value of tth classification, t is the number of the classification; the y is the classification label obtained by training; the $loss_t$ is a classification error of the tth classification, and the $y = \max_y \log p(y)$ represents that the classification label obtained is correct.

10. The classification device according to claim 6, wherein the operation of processing the image information of the current local observation area to obtain the feature vector of the scene picture to be classified comprises:
encoding the image information of the current local observation area to obtain a local feature vector; and
performing a fusion operation on the local feature vector and a pre-stored feature vector to obtain the feature vector of the scene picture to be classified.

* * * * *